United States Patent [19]

Zirngibl

[11] Patent Number: 5,128,800
[45] Date of Patent: Jul. 7, 1992

[54] GAIN SWITCHABLE OPTICAL FIBER AMPLIFIER

[75] Inventor: Martin Zirngibl, Middletown, N.J.

[73] Assignee: AT&T Bell Laboratories, Murray Hill, N.J.

[21] Appl. No.: 717,435

[22] Filed: Jun. 19, 1991

[51] Int. Cl.$^5$ .................. H01S 3/103; H01S 3/30; G02B 6/26
[52] U.S. Cl. .................. 359/341; 359/336; 305/1; 372/6; 372/31
[58] Field of Search ............ 330/4.3; 350/96.13, 350/354; 372/6, 21, 31; 359/341, 336; 385/1, 122

[56] References Cited

U.S. PATENT DOCUMENTS

| | | | |
|---|---|---|---|
| 4,484,144 | 11/1984 | Nakagawa et al. | 330/4.3 |
| 4,736,164 | 4/1988 | Henning | 330/4.3 |
| 4,812,776 | 3/1989 | Sasaki | 330/4.3 |
| 4,910,737 | 3/1990 | Payne et al. | |
| 4,958,354 | 9/1990 | Urahain et al. | 372/31 |
| 4,971,417 | 11/1990 | Kriashy et al. | 350/96.13 |
| 4,995,045 | 2/1991 | Burley et al. | 372/31 |
| 4,995,690 | 2/1991 | Islam | 350/96.13 |

OTHER PUBLICATIONS

Ellis et al., "Automatic Gain Control . . . Fiber Amplifier Systems", Electron. Lett., vol. 27, #3, pp. 193–195, Jan. 1991; Abst. only.
Nanii et al.; "Bidirectional . . . Nonlinear Absorber"; Journ. of Quant. Elect., vol. 19, #6, pp. 726–729, Jun. 1989; Abst. only.

Primary Examiner—Nelson Moskowitz
Attorney, Agent, or Firm—E. Weiss; S. H. Dworetsky

[57] ABSTRACT

An optical fiber amplifier has a lossy nonlinear medium connected between its input port and its output port. The resultant optical feedback loop permits remote gain switching of the optical amplifier.

7 Claims, 6 Drawing Sheets

INPUT POWER AT FEEDBACK WAVELENGTH

GAIN SWITCHABLE OPTICAL FIBER AMPLIFIER

FIELD OF THE INVENTION

This invention relates to fiber amplifiers, and more particularly, to such amplifiers in which the gain can be purposefully varied.

BACKGROUND OF THE INVENTION

The development, in the 1970's, of economic processes for fabricating low loss optical fibers opened the field of optical communications which has had a major impact on information management and movement. Initial efforts were concentrated in the transmission area. In these initial efforts, optical fiber was used as a high bandwidth transmission medium that was interposed in an otherwise electronic matrix. Accordingly, electrical signals representative of intelligence were transformed into optical signals for transmission and then, at the receiving end, were retransformed back into electrical signals for further processing. However, it was always realized that maximum economies would be obtained if the signals could also be processed in optical form, instead of simply being transmitted in optical form. Accordingly, techniques for optical switching and computing continue to be developed. However, among the first areas into which optical communications has branched, beyond transmission, is the field of optical amplification.

Heretofore, amplification and regeneration required transformation of the optical signal into electrical form. However, recently commercially viable optical amplifiers have been fabricated, primarily using erbium-doped optical amplifiers. Such amplifying fibers exhibit low noise, relatively large, polarization-independent bandwidth, reduced cross-talk, and low insertion loss, and are relatively cheap to fabricate. The fibers can be coupled end-to-end to a transmission fiber and transversely coupled through a directional coupler to a laser diode pump. However, the gain could exhibit undesirable fluctuations due to saturation effects. Recently, electro-optical feedback loops have been used to reduce this gain fluctuation (E. Desurvire et al, CLEO91; Baltimore, Md., April 1991, Paper CThJ3). Additionally, further improved gain stabilization schemes have been reported using all optical feedback loops (M. Zirngibl, *Electronics Letters*, Vol. 27, No. 7, pg. 560, March 28, 1991). However, due to the very long lifetimes of the relevant excited states that partake in the amplification, fast gain switching which would be needed, for example, in packet switching, appears to be unattainable. Nevertheless, to direct traffic flow, slow gain switching schemes may still be of commercial interest.

SUMMARY OF THE INVENTION

This invention is an all-optical gain-switchable optical fiber amplifier which can be remotely gain switched. In an embodiment of the invention a feedback loop is connected between the output port and the input port of an optical fiber amplifier. A nonlinear lossy material is placed in the feedback loop. When so connected, the amplifier/feedback-loop system has a finite number, greater than one, of stable gain operation states. The system can be switched from one state to another by injecting into the amplifier optical energy of appropriate wavelength and power. In a specific embodiment, the optical fiber amplifier and/or the nonlinear medium may comprise an erbium-doped optical fiber.

DETAILED DESCRIPTION

The invention involves a fiber optical amplifier with a feedback loop connected between the input port of the amplifier and the output port of the amplifier. A nonlinear lossy medium in the feedback loop results in a finite number, greater than one, of stable operation states associated with the optical-fiber-amplifier/feedback-loop system. (For the purposes of this patent the term nonlinear medium is taken to mean a material whose transmission characteristics vary nonlinearly with optical power in the medium.)

Figure 1:
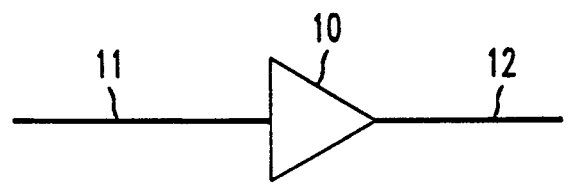
FIG. 1 is a schematic representation of a prior art optical fiber amplifier.
Figure 2:
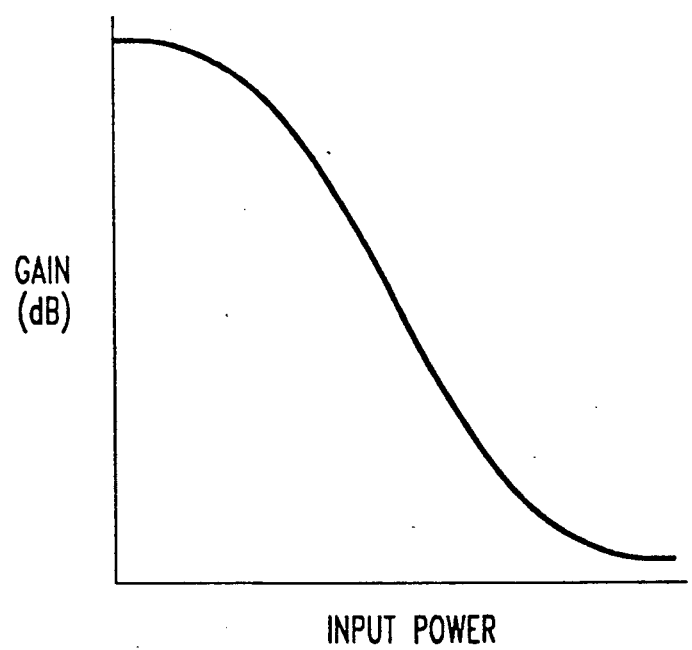
FIG. 2 is a schematic representation of the gain saturation curve associated with the optical fiber amplifier of FIG. 1.

The principles underlying the inventive device will be more readily appreciated by first considering both the basic fiber optical amplifier and the gain stabilized fiber optical amplifier. FIG. 1 is a schematic representation of an optical fiber amplifier 10. Such amplifiers are now well known in the art and comprise, for example, an erbium-doped silica-based optical fiber that acts as a gain medium. When the erbium doped gain medium is appropriately pumped, for example, by optical pumping, the population of states is inverted. Under such circumstances, signal optical energy of appropriate wavelength, when fed into the amplifier by exemplary fiber 11, is amplified and exits via exemplary fiber 12. However, the gain of the amplifier is not constant with input optical signal power. Rather, as the input power increases, the gain medium saturates and the gain decreases. This is shown schematically in FIG. 2. Clearly, this variation in gain is undesirable.

Figure 3:
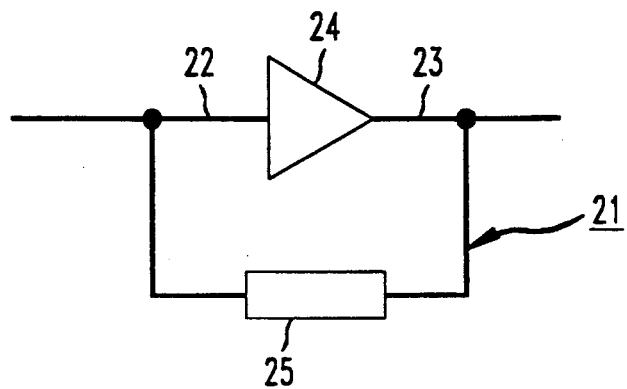
FIG. 3 is a schematic representation of a gain stabilized optical fiber amplifier.
Figure 4:
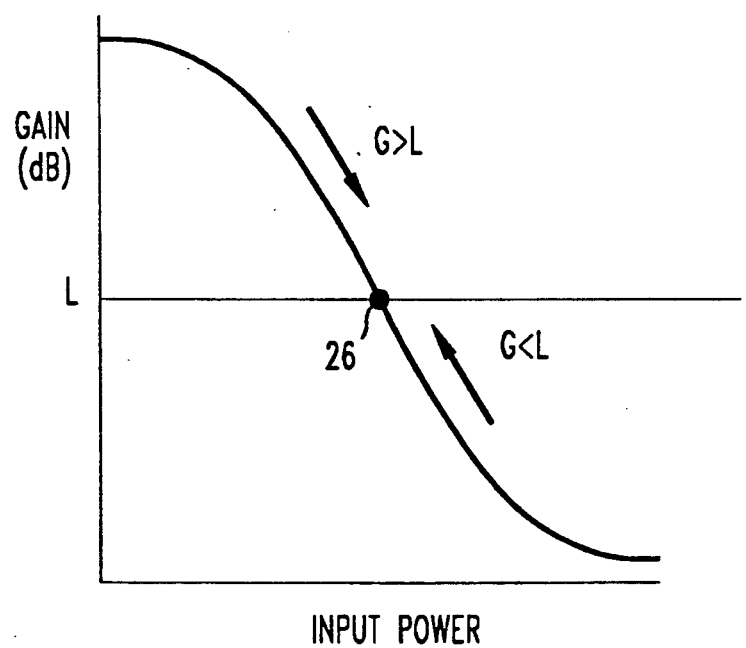
FIG. 4 is a schematic representation of the gain saturation curve associated with the gain stabilized optical fiber amplifier of FIG. 3.

Recently, an all optical technique was disclosed to stabilize the gain characteristics of fiber optical amplifiers (M. Zirngibl, *Electronics Letters*, Vol. 27, No. 7, pg. 560, Mar. 28, 1991). The technique is shown schematically in FIG. 3 and involves the use of an optical feedback loop 21 between the input port 22 and the output port 23 of the optical fiber amplifier 24. A material 25 that displays loss at relevant wavelengths is inserted in the feedback loop. Some of the output power, at specific wavelengths, is directed through the feedback loop. In FIG. 4 the gain saturation curve of the amplifier and the loss characteristics of medium 25 are represented schematically. If the loss of medium 25 is greater than the gain of the amplifier, i.e., $G<L$, then the amplifier cannot compensate for the loss and the power in the feedback loop decreases. Accordingly, and as shown by the upward arrow in FIG. 4, when the power in the feedback loop decreases, the gain increases. If on the other hand the loss associated with medium 25 is less than the gain, i.e., $G>L$, then the amplifier more than compensates for the loss in the feedback loop and the power in the feedback loop increases. As shown by the downward arrow in FIG. 4, this increase results in a decrease in gain. This heuristic analysis indicates that, if $G<L$, the gain increases, and if $G>L$, the gain decreases. Accordingly, the only stable operating point is when G equals L. Therefore, the device of FIG. 3 yields a gain stabilized optical fiber amplifier.

Figure 5:
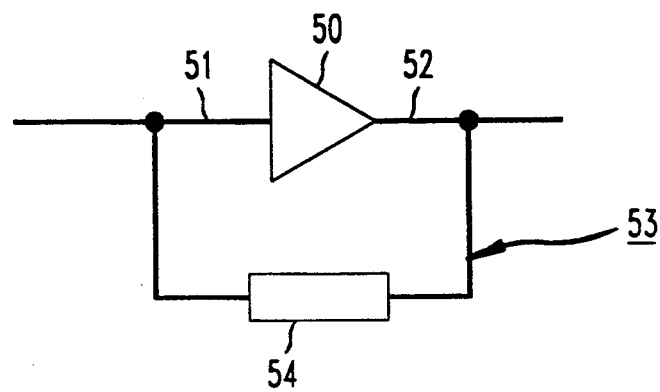
FIG. 5 is a schematic representation of the inventive gain switchable optical fiber amplifier.

The inventive gain switchable optical fiber amplifier is shown schematically in FIG. 5. In this figure, 50 is a fiber amplifier, 51 is an exemplary fiber input port, 52 is an exemplary fiber output port, 53 is a feedback loop and 54 is a lossy nonlinear medium. (While the feedback loop in this application is generally identified as an optical fiber, it will be understood that in particular embodiments the feedback loop may be any appropriate structure that returns at least a portion of the output to the input. Accordingly, appropriate reflectors forming, for example, a linear cavity is also included within the term "feedback loop" as it is used in this application. Practitioners in the field will, of course, appreciate that the fiber feedback loop forms what many call a "ring cavity".) The nonlinear medium is homgeneously broadened. (For the purposes of this application even a medium that is only partially homogeneously broadened is referred to as homogeneously broadened.)

Figure 6:
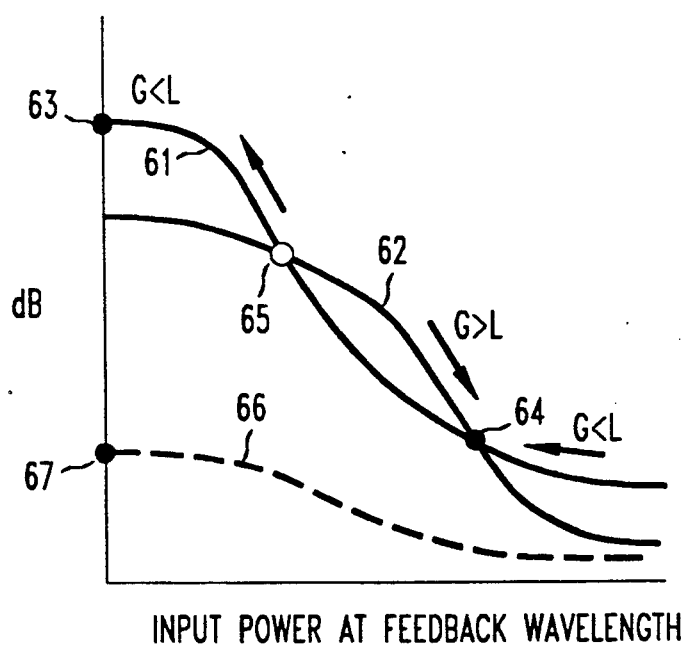
FIG. 6 is a schematic representation of the gain saturation curve associated with the inventive gain switchable optical fiber amplifier of FIG. 5.

FIG. 6 is a schematic representation of the optical characteristics of the optical fiber amplifier 50 and the nonlinear medium 54. In FIG. 6, 62 is the gain saturation curve associated with the optical fiber amplifier 50 and 61 represents the characteristics of the nonlinear loss medium 54. As in FIG. 4, in regions where $G<L$, the gain tends to increase, whereas in regions where $G>L$, the gain tends to decrease. Accordingly, following the analysis articulated in connection with FIG. 4, there are only two stable operating points in FIG. 6. These operating points are indicated by 63 and 64.

Initially, the device of FIG. 5 operates at point 63. As the input power at the feedback wavelength is increased, the system moves to operating point 64. (It should be noted that the input power need only be great enough to move the system to point 65 since, at that point, the instability characteristics of the system will automatically move it to point 64. The additional power necessary to move from point 65 to point 64 is obtained as a result of the amplification properties of the amplifier 50.)

Once the system is at point 64, the gain may be switched back to point 63 by applying a signal, of wavelength different than the wavelength selected for the feedback loop, which saturates the amplifier sufficiently to change the gain curve from curve 62 to, for example, curve 66. Clearly, if the gain curve is represented by 66, instead of curve 62, while the loss curve is still represented by 61, then G will always be less than L. If the gain is always less than the loss, the power in the feedback loop must be zero and the only stable operating point is point 67. If, once the system moves to point 67, the saturating power removed, the system will operate at point 63 and will have been switched from point 64 to point 63 via point 67.

It should be appreciated that the discussion of the invention to this point has been extremely general. In practice the inventive device may include additional elements that are not absolutely necessary to the practice of the invention but may be beneficial depending upon the particular embodiment being practiced. So, for example, various isolators and interference filters may be used in the feedback loop to determine the wavelengths that are transmitted in that portion of the device. Additionally, the amplifier and/or the lossy medium may comprise erbium-doped silica-based optical fibers. Coupling between the feedback loop and the input and/or output ports may be by way of well-known selective wavelength couplers. Likewise, pump radiation necessary for operation of the amplifier may be introduced into the amplifier by means of an appropriate wavelength selective coupler. Pumping radiation necessary to switch the system from one stable gain operation point to another may be introduced into the amplifier along with the signal that is being amplified. Of course, the amplifier itself will likely be connected to other elements of an exemplary transmission system via appropriate optical fibers and connectors.

Figure 7:
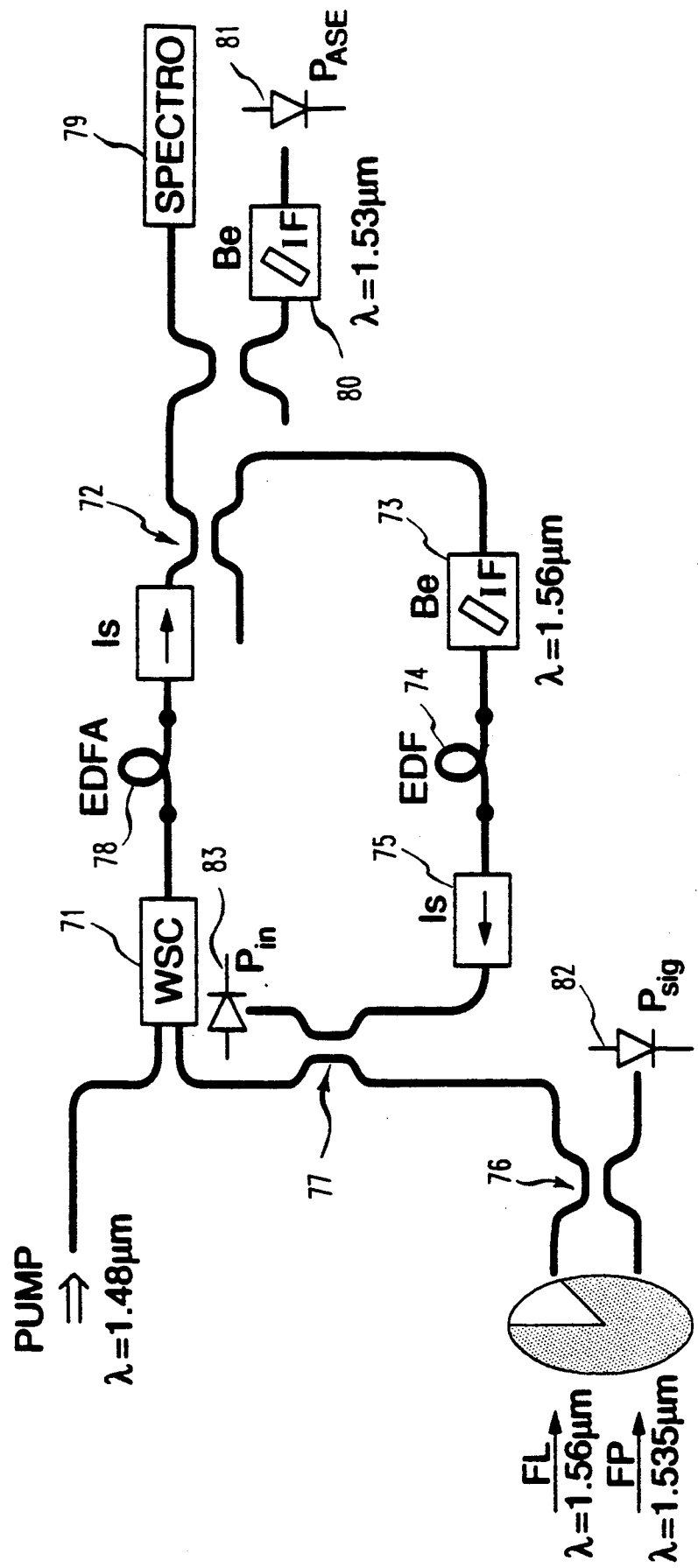
FIG. 7 is a schematic representation of a specific embodiment of the invention.

A specific embodiment is shown in FIG. 7. The erbium doped fiber amplifier (EDFA) 78 consists of 19.5 m of a $Al_2O_3:GeO_2:SiO_2$ fiber with a small-signal peak gain of 34 dB. Pump radiation is introduced in the amplifier by means of a wavelength selective coupler 71 at 1.48 μm. The output of the EDFA is first isolated and then split by a wavelength independent 3 dB coupler (WIC) 72 into an output branch and a feedback branch. In the feedback loop, an interference filter 73 tuned to 1560 nm with a 3 dB bandwidth of 1.2 nm is inserted into a beam expander. The saturable absorber consists of 4 m of a second piece of $Al_2O_3:GeO_2:SiO_2$ Er-doped fiber 74 whose small signal absorption coefficient at 1560 nm was measured to be 5 dB/m. An isolator 75 prevents the backward amplifier spontaneous emission (ASE) from entering into the feedback loop. Two signal channels 76 are multiplexed with the nonlinear feedback loop (NFL) signal in a wavelength independent coupler 77 and input to the EDFA 78 through the wavelength selective coupler (WSC) 71. The sources of the signal channels are a narrow bandwidth fiber laser (FL) tuned exactly to the feedback wavelength of 1560 nm and a Fabry Perot laser diode (FP) whose frequency spectrum is centered around 1535 nm. To study the dynamics of this switching scheme, the two signal channels are chopped simultaneously in beam expanders. The EDFA output is monitored by an optical spectrum analyzer 79. A second output branch is filtered in a beam expander 80 and detected by a Ge-photodetector 81. Ge-photodetectors are also used to monitor the signal power at $P_{sig}$ 82 and the EDFA input at $P_{in}$ 83.

Figure 8:
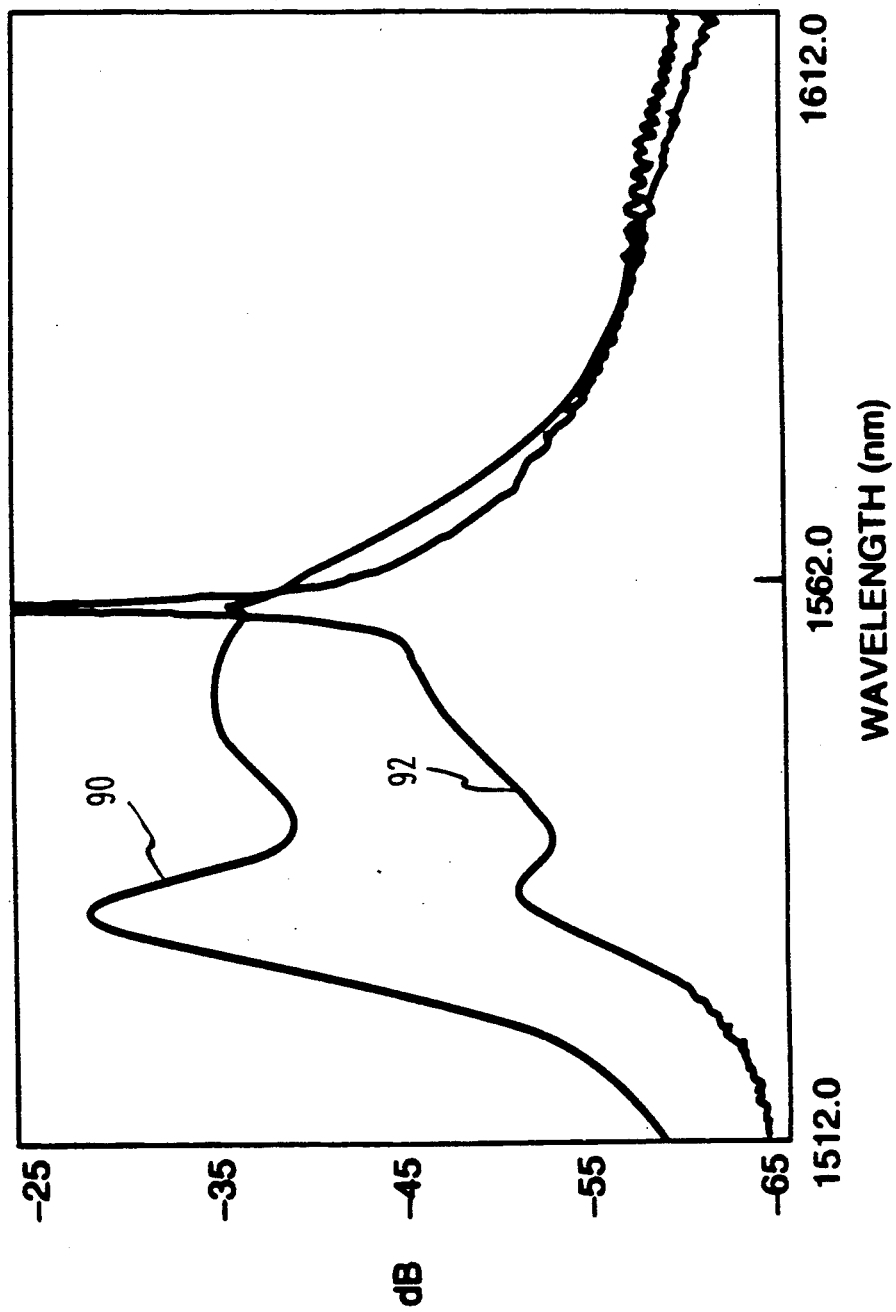
FIG. 8 represents output spectra associated with the embodiment of FIG. 7 corresponding to the two states of the bistable system.

The output spectra corresponding to the two stable states of the bistable system of the EDFA-NFL scheme are displayed in FIG. 8. When the pump is first turned on, the system does not self-start lasing and the output spectrum for this case is given by the top curve 90 in FIG. 8. The system is switched to lasing operation by injecting −24 dBm cw power (as measured at $P_{in}$) at 1560 nm from the fiber laser, and remains lasing after removal of this signal. The output spectrum for this case is shown by the lower curve 92 in FIG. 8. The lasing saturates the ASE by approximately 22 dB at the peak emission wavelength of 1530 nm. The power in the feedback loop (as measured at $P_{in}$) was $-8$ dBm. Switching back to the non-lasing state is achieved by injecting $-8.5$ dBm (as measured at $P_{in}$) from the 1535 nm laser diode. The ASE difference between the two states can not be exactly identified with the small signal gain difference due to the distributed generation of spontaneous emission over the whole fiber length. I therefore investigated the small signal gain difference at 1530 nm by tuning the FL to this wavelength after switching on the ring-lasing. A net small signal gain difference of 26 dB between the two bistable states was found.

Figure 9:
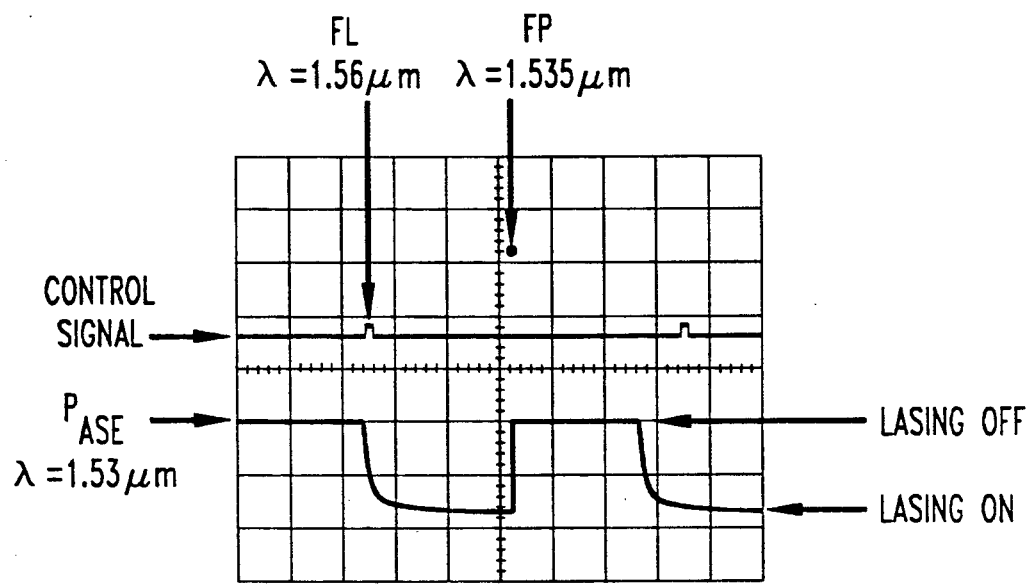
FIG. 9 is a trace of the signals that are input into the inventive device and the time evolution of the amplifier spontaneous emission (ASE).

The dynamics of this switch was checked by alternatively injecting the switching signals by means of a chopper. The output IF was tuned to 1530 nm so that the ASE peak power in a 1.2 nm bandwidth was monitored by the Ge photodetector. The upper trace in FIG. 9 shows the two alternating input signals detected at $P_{sig}$ and the lower trace the time evolution of the ASE. As expected, the switching times of 10-50 ms due to the long $^4I_{13/2}$ lifetime of the $Er^{3+}$.

As reported above, and also observed in FIG. 7, we need much more signal power to switch the lasing off than to switch it on. This is explained by the fact that the off-switching control signal has to decrease the already strongly saturated gain by an additional sufficiently large amount to depress the gain at the feedback wavelength below the minimum loss in the NFL. Therefore, the power of the switching-off signal has to be of the same order of magnitude as the ring-lasing power. In specific embodiments, where it is not convenient to deal with high control signal power levels, this detail can be handled by selectively amplifying the switching-off control signal in a second EDFA.

The switching range in the presented scheme is limited by linear losses in the feedback loop like the WIC. In an optimized version, the multiplexing between signal input and output channel and feedback channel may be accomplished with "loss-free" WSC's. In such a case, a gain switching between transparency (1 dB) and unsaturated small signal gain could be theoretically achieved by using, in the feedback loop, an Er-doped fiber whose small signal loss compensates exactly the small signal gain in the EDFA at the feedback wavelength.

I claim:

1. A gain switchable optical fiber amplifier comprising: an optical fiber amplifier having an optical input port and an optical output port and comprising a rare earth doped optical fiber;
   an optical feedback loop coupled between the output port and the input port of said optical fiber amplifier;
   said optical feedback loop comprising a lossy nonlinear medium adapted to cause said optical fiber amplifier to have at least a first stable state of operation and a second state of operation; and
   wavelength selective means disposed in the said feedback loop to limit the wavelengths transmitted through the nonlinear medium to a subset of the gain spectrum of the optical fiber amplifier;
   an said wavelength selective means comprises a fiber interference filter disposed on one side of the nonlinear medium, an optical fiber isolator disposed on the other side nonlinear medium;
   and means coupled to said optical fiber amplifier to selectively switch the optical fiber amplifier from said first stable state of operation to said second stable state of operation.

2. The device of claim 1 wherein the feedback loop comprises an optical fiber forming with the amplifier a ring cavity.

3. The device of claim 1 wherein said wavelength selective means comprises a fiber interference filter.

4. The device of claims 1 or 2 wherein the optical fiber amplifier comprises an erbium doped fiber.

5. The device of claim 4 further comprising a wavelength selective couple for transmitting pump energy into said erbium doped fiber amplifier.

6. The device of claim 1 wherein said wavelength selective means comprises a first wavelength selective coupler disposed between the output port of the said optical amplifier and the nonlinear medium.

7. The device of claim 4 wherein the nonlinear medium is an erbium doped optical fiber.

* * * * *